(12) United States Patent
Hasegawa et al.

(10) Patent No.: US 7,083,661 B2
(45) Date of Patent: Aug. 1, 2006

(54) AIR FILTER ELEMENT AND METHOD OF PRODUCING THE SAME

(75) Inventors: Naoji Hasegawa, Kawasaki (JP);
Isamu Kawawa, Kawasaki (JP);
Takayoshi Kuboyama, Kawasaki (JP)

(73) Assignee: Toyo Element Industry Co., Ltd., Kanagawa (JP)

( * ) Notice: Subject to any disclaimer, the term of this patent is extended or adjusted under 35 U.S.C. 154(b) by 231 days.

(21) Appl. No.: 10/433,331

(22) PCT Filed: Jun. 20, 2001

(86) PCT No.: PCT/JP01/05244

§ 371 (c)(1),
(2), (4) Date: Oct. 6, 2003

(87) PCT Pub. No.: WO02/43834

PCT Pub. Date: Jun. 6, 2002

(65) Prior Publication Data

US 2004/0068970 A1    Apr. 15, 2004

(30) Foreign Application Priority Data

Dec. 1, 2000    (JP) .............................. 2000-367758

(51) Int. Cl.
*B01D 27/06* (2006.01)
(52) U.S. Cl. .................... 55/498; 55/502; 55/510; 264/268
(58) Field of Classification Search ............... 55/498, 55/502, 505, 507, 510; 156/69; 264/267, 264/268
See application file for complete search history.

(56) References Cited

U.S. PATENT DOCUMENTS 3,372,073 A * 3/1968 Cutler ........................ 156/69

(Continued)

OTHER PUBLICATIONS

Microfilm of the specification and drawing annexed to the request of Japanese Utility Model Appiication No. 11483/1978 (Laid open No. 115679/1979) (Toyo Element Kogyo K.K.), Aug. 14, 1979 p. 2, lines 9 to 16.

*Primary Examiner*—Robert A. Hopkins
(74) *Attorney, Agent, or Firm*—Sughrue Mion, PLLC

(57) ABSTRACT

There is provided an air filter element which is used by fitting a central opening in its end plate on a cylindrical portion projecting into a casing, wherein the air filter element has a novel seal construction (end plate). An end plate (10) closing the end surface of a hollow cylindrical filter portion (2) includes a soft inner peripheral seal portion (11) capable of sticking to the outer surface of a cylindrical member (33) and a rigid closure portion (13) which is disposed on the outer periphery side of the inner peripheral seal portion and in which the end surface of the filter portion is embedded, the end plate being of composite construction in which the inner peripheral seal portion (11) and the closure portion (13) are integrally molded. On the outer periphery side of the inner peripheral seal portion (11), a groove (12) axially extending from an end surface (10a) of the end plate is formed along the opening. The inner peripheral seal portion (11) effects reliable center seal with respect to the cylindrical member (33), while the closure portion (13) on the outside thereof improves the rigidity of the air filter element.

4 Claims, 5 Drawing Sheets

U.S. PATENT DOCUMENTS

| | | |
|---|---|---|
| 5,484,466 A | 1/1996 | Brown et al. |
| 5,556,440 A | 9/1996 | Mullins et al. |
| 6,355,077 B1 * | 3/2002 | Chittenden et al. ......... 55/385.3 |
| 6,652,614 B1 * | 11/2003 | Gieseke et al. ................ 55/498 |
| 6,706,087 B1 * | 3/2004 | Gebler et al. .................. 55/492 |

* cited by examiner

F I G. 2
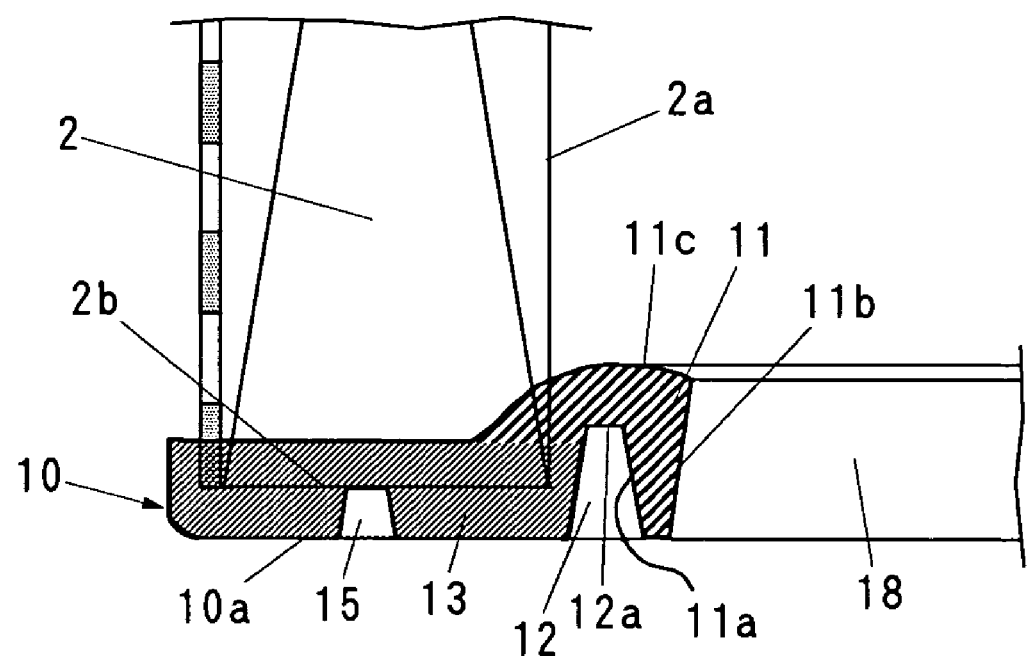

AIR FILTER ELEMENT AND METHOD OF PRODUCING THE SAME

TECHNICAL FIELD

The present invention relates to an air filter element which is used by fitting a central opening in an end plate thereof on a cylindrical member projecting into a casing of an air cleaner or air filter and, more particularly, to an air filter element suitable for an internal combustion engine, and a method of producing the same.

BACKGROUND ART

As an air cleaner used for an internal combustion engine or the like, an air cleaner in which an air filter element having a cylindrical filter portion is installed to an air outlet (cylindrical member) projectingly formed in a casing to be contained in the casing is known. In this air filter element, both end surfaces of the hollow cylindrical filter portion are closed by end plates, and an opening for causing a fluid to pass through is formed in the center of at least one end plate, by which the air filter element is used by fitting the opening on the air outlet. Air is introduced from the outside of the casing into a space formed on the outside of the air filter element in the casing, caused to pass through from the outside to the inside in the cylindrical filter portion, and purified air is discharged from an inside space (filter chamber) of the air filter element to the outside of the casing through the air outlet.

Seal between the air filter element and the casing, which is necessary to prevent contaminated air from flowing into the filter chamber, is provided by the end surface of the end plate which is installed to the air outlet (end surface side of filter portion) and the inner surface of the casing opposed to the end plate (axial seal), by the opening of the end plate (inner periphery side of filter portion) and the outer surface of the air outlet (center seal (O-ring etc.)), or by both of them. U.S. Pat. No. 4,720,292 has disclosed an air filter using center seal.

An object of the present invention is to provide an air filter element having a novel seal construction (end plate construction) in which seal between an air filter element and a casing is provided between an opening of an end plate and the outer surface of an air outlet (cylindrical member), and a method of producing the air filter element.

DISCLOSURE OF THE INVENTION

In an air filter element in accordance with the present invention, an end plate, which closes the end surface of a hollow cylindrical filter portion and is formed, in the center thereof, with an opening that is fitted on a cylindrical member, includes a soft inner peripheral seal portion capable of sticking to the outer surface of the cylindrical member and a rigid closure portion which is disposed on the outer periphery side of the inner peripheral seal portion and in which the end surface of the filter portion is embedded, the end plate being of composite construction in which the inner peripheral seal portion and the closure portion are integrally molded.

The phrase "integrally molded" means that the inner peripheral seal portion and/or the closure portion are fixed to and integrated with each other by molding using a synthetic resin without the use of an adhesive.

The end plate is made up of the soft inner peripheral seal portion and the rigid closure portion in which the end surface of filter portion is embedded, the end plate being of composite construction in which the inner peripheral seal portion and the closure portion are integrally molded. Therefore, center seal (radial seal in the center of the filter element) is provided reliably with compression of the inner peripheral seal portion. Also, since the filter portion is firmly fixed by the rigid closure portion, the rigidity of air filter element is enhanced. Since the end plate consists of composite construction in which the soft inner peripheral seal portion and the rigid closure portion are integrally molded without the use of an adhesive, the bonding of these portions is strong, and hence the seal portion is not separated.

Comparing with the case where the whole of the end plate is molded using a soft material such as elastomer, a sufficient strength can be obtained, and the strength is improved. Therefore, the thickness of the end plate can be decreased, which leads to an increase in filter area. Also, if the whole of the end plate is molded using a soft expanded material, poor molding such as a void (cavity or dent in outer surface) occurs easily. The method in accordance with the present invention can solve this problem.

Also, in a preferred mode, on the outer periphery side of the inner peripheral seal portion (11), a groove (12) axially extending from the end surface of the end plate (10) is formed along the opening (18), and on the outer periphery side of the groove, the closure portion (13) is formed. By this configuration, reliable center seal is provided by the compression and deflection of the inner peripheral seal portion caused by the cylindrical member. By adjusting the dimension of groove, the degree of deflection of the inner peripheral seal portion can be adjusted. When the air filter element is pulled out at the time of replacement after use, it can be pulled out easily owing to the deflection of the inner peripheral seal portion.

By providing a plurality of ribs, which connect the inner peripheral seal portion and the closure portion to each other, in the groove, the shape of the inner peripheral seal portion can be held by the ribs, and also the degree of deflection of the inner peripheral seal portion can be adjusted.

The air filter element in accordance with the present invention can be produced easily and reliably by pouring a synthetic resin material, which is soft after curing, to the inner periphery side of a ring-shaped concave portion in a mold formed with the ring-shaped concave portion for molding the end plate, by pouring a synthetic resin material, which is rigid after curing, to the outer periphery side of the ring-shaped concave portion, and by inserting the end surface of the filter portion is inserted into the ring-shaped concave portion to integrally cure both of the synthetic resin materials. Also, the air filter element in accordance with the present invention can be produced by disposing a soft seal member having been molded in advance on the inner periphery side of the ring-shaped concave portion in the mold, by pouring a synthetic resin material, which is rigid after curing, to the outer periphery side of the ring-shaped concave portion, and by inserting the end surface of the filter portion into the ring-shaped concave portion to cure the synthetic resin material integrally with the seal member.

BRIEF DESCRIPTION OF THE DRAWINGS

FIG. 2 is an enlarged sectional view of a part of an end plate 10 in accordance with Example 1;

BEST MODE FOR CARRYING OUT THE INVENTION

Figure 1:
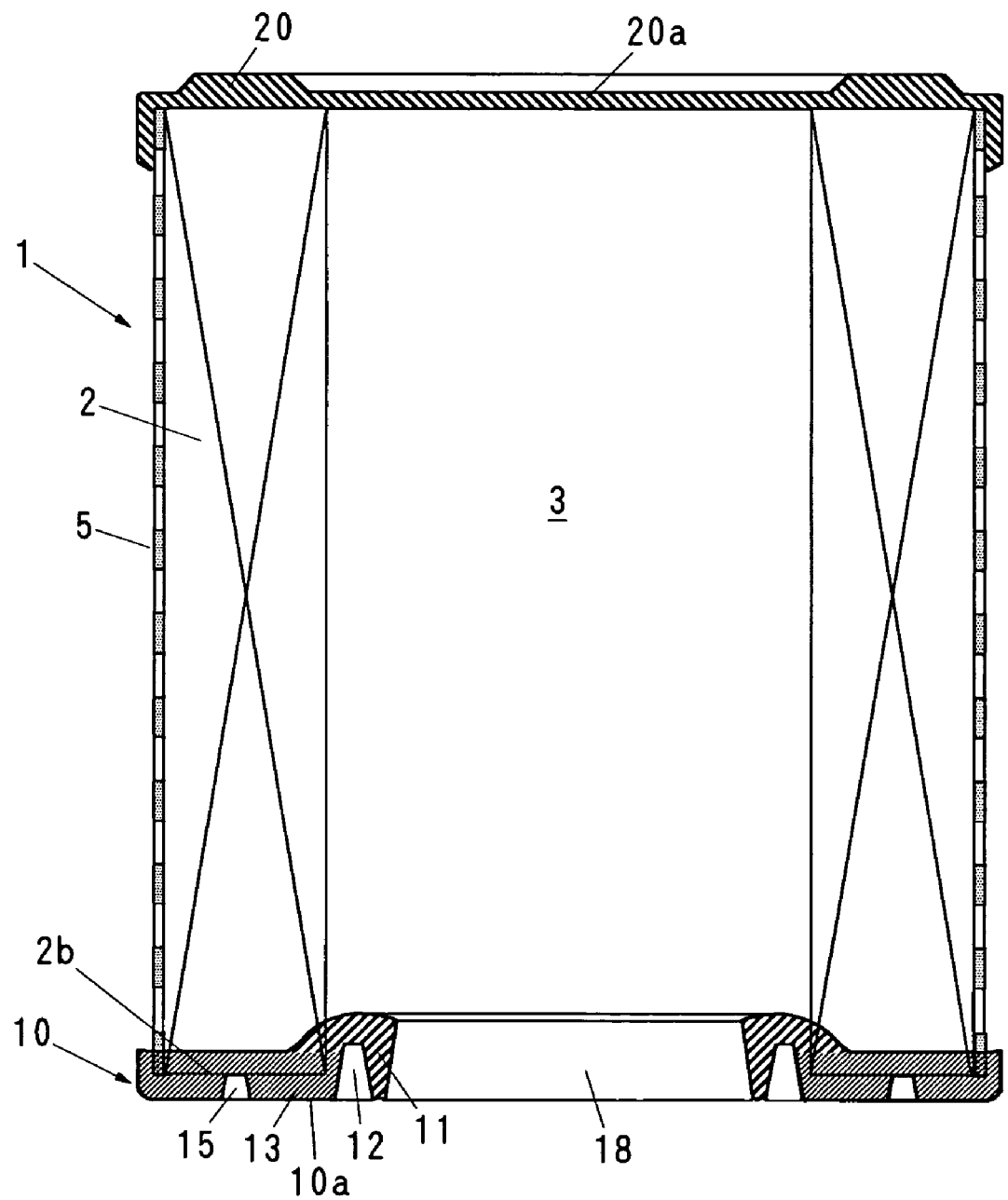
FIG. 1 is a longitudinal sectional view of an air filter element 1 in accordance with Example 1.

An embodiment of the present invention will now be described in detail with reference to the accompanying drawings. The same reference numerals are applied to the same elements, and duplicated explanation is omitted appropriately.

Example 1

FIG. 1 is a longitudinal sectional view of an air filter element 1 in accordance with Example 1, and FIG. 2 is an enlarged sectional view of a part of an end plate 10. The air filter element 1 has a hollow cylindrical filter portion 2 and the end plates 10 and 20 for closing both end surfaces of the filter portion 2. In the center of one end plate 10, an opening 18 is formed to discharge a fluid that has passed through the filter portion 2 and has been filtered. The air filter element 1 is used by fitting the opening 18 on a cylindrical member (air outlet) 33, described later. The construction of the other end plate 20 is not subject to any special restriction. In this example, the end plate 20 is formed by one plate-shaped member having a closing portion 20a for separating a filter chamber (inside space of the filter portion 2) 3 from an outside space, which closes the whole of one end surface of the air filter element 1 as a whole. In the filter portion 2, a sheet-shaped filter material such as filter paper or nonwoven fabric appropriately folded into a chrysanthemum shape in cross section is preferably used. A wound sheet-shaped filter material or other types thereof can be used, and the type of the filter material is not subject to any special restriction. Also, in the example shown in Figure, a porous tube 5 is disposed on the outer peripheral surface of the filter portion 2 so as to be embedded in the closure portion 13. However, a support member such as the porous tube 5 may be disposed in an arbitrary position, and may be disposed on the outer peripheral surface and/or the inner peripheral surface of the filter portion 2.

The end plate 10 is made up of a soft inner peripheral seal portion 11 and a rigid closure portion 13 for closing an end surface 2b of the filter portion 2, the end plate being of composite construction in which the inner peripheral seal portion 11 and the closure portion 13 are integrally molded. The opening 18 in the end plate 10 is formed by the soft inner peripheral seal portion 11 capable of sticking to the outer surface of the cylindrical member 33. In the rigid closure portion 13, the end surface 2b of the filter portion 2 is embedded and fixed to close the end surface 2b of the filter portion 2.

On the outer periphery side of the inner peripheral seal portion 11 (on the outside in the radial direction of filter element), a groove 12 axially (in the height direction) extending from an end surface 10a of the end plate 10 is formed along the opening 18.

As shown in FIG. 2, the groove 12 is located on the inside in the radial direction of an inner peripheral surface 2a of the filter portion 2, and the deepest portion (bottom portion 12a) of the groove is located on the inside in the axial direction of the end surface 2b of the filter portion 2. The groove 12 is formed into a ring shape along the opening 18. The groove 12 is formed so that the groove width decreases toward the bottom portion 12a. The inside wall of the groove 12 is formed by the inner peripheral seal portion 11, and the outside wall of the groove 12 is formed by the rigid closure portion 13. On the outside in the radial direction of the groove 12, the closure portion 13 is formed to close the end surface 2b of the filter portion 2.

By forming the groove 12, the inner peripheral seal portion 11 can deflect. An outer wall 11a of the inner peripheral seal portion 11 forms the inside wall of the groove 12, and has a height corresponding to the depth of the groove 12. An inner wall 11b of the inner peripheral seal portion 11 forms the opening 18, and is formed so as to be higher than the depth of the groove 12. Also, the inner wall 11b of the inner peripheral seal portion 11 is formed into a tapered shape so that the opening diameter decreases toward the inside in the axial direction. The shape of the inner wall 11b (inner peripheral surface shape) is not subject to any special restriction if it sticks to the outer surface of the cylindrical member to fulfil sealing function. The inner wall 11b may be formed appropriately so as to have a convex portion or a concave portion (step portion).

A top surface 11c of the inner peripheral seal portion 11 extends to the outside in the radial direction so as to cover the bottom portion 12a of the groove 12, and is connected to the rigid closure portion 13. The inner peripheral seal portion 11 extends to the inner periphery side from a position above the bottom portion 12a of the groove 12, and thereafter extends to the outside in the axial direction by being bent into a hook shape. The inner peripheral seal portion 11 substantially has an L shape in cross section as a whole. On the inside of the groove 12, the cross section of the inner peripheral seal portion 11 is formed into a trapezoidal shape which is long in the axial direction.

The inner peripheral seal portion 11 is formed of an elastic material suitable for fulfilling the sealing function, for example, a soft expanded synthetic resin, preferably expanded urethane resin etc. The rigid closure portion 13 is formed of a synthetic resin more rigid than the inner peripheral seal portion 11, for example, rigid (not elastic) urethane resin, etc. The closure portion 13, which is a rigid synthetic resin portion, does not take part in sealing between the air filter element and the casing, so that it is formed of a material that is more rigid than the inner peripheral seal portion 11, hardly having elasticity, and is unsuitable for fulfilling the sealing function. If the soft inner peripheral seal portion and the rigid closure portion are formed of the same kind of material, for example, if the soft inner peripheral seal portion is formed of soft expanded urethane resin and the rigid closure portion is formed of rigid urethane resin, the combination of these materials enables more strongly integral molding. The soft expanded synthetic resin consisting of expanded urethane resin etc. which has a surface hardness of about 30 to 50 (ASKER C) and the rigid synthetic resin consisting of rigid expanded urethane resin etc. which has a surface hardness of about 35 to 55 (SHORE D) (for example, measured in accordance with JIS K-6301) are preferably used.

The boundary between the soft inner peripheral seal portion 11 and the rigid closure portion 13 need not necessarily be formed definitely as shown in Figure, and the boundary position can be changed appropriately. As will be described later, a concave portion 15 formed in the central portion in the radial direction of the end surface of the rigid closure portion 13 is formed to determine the position of the end surface 2b of the filter portion 2, and is formed continuously in an annular shape or partially.

Figure 3:
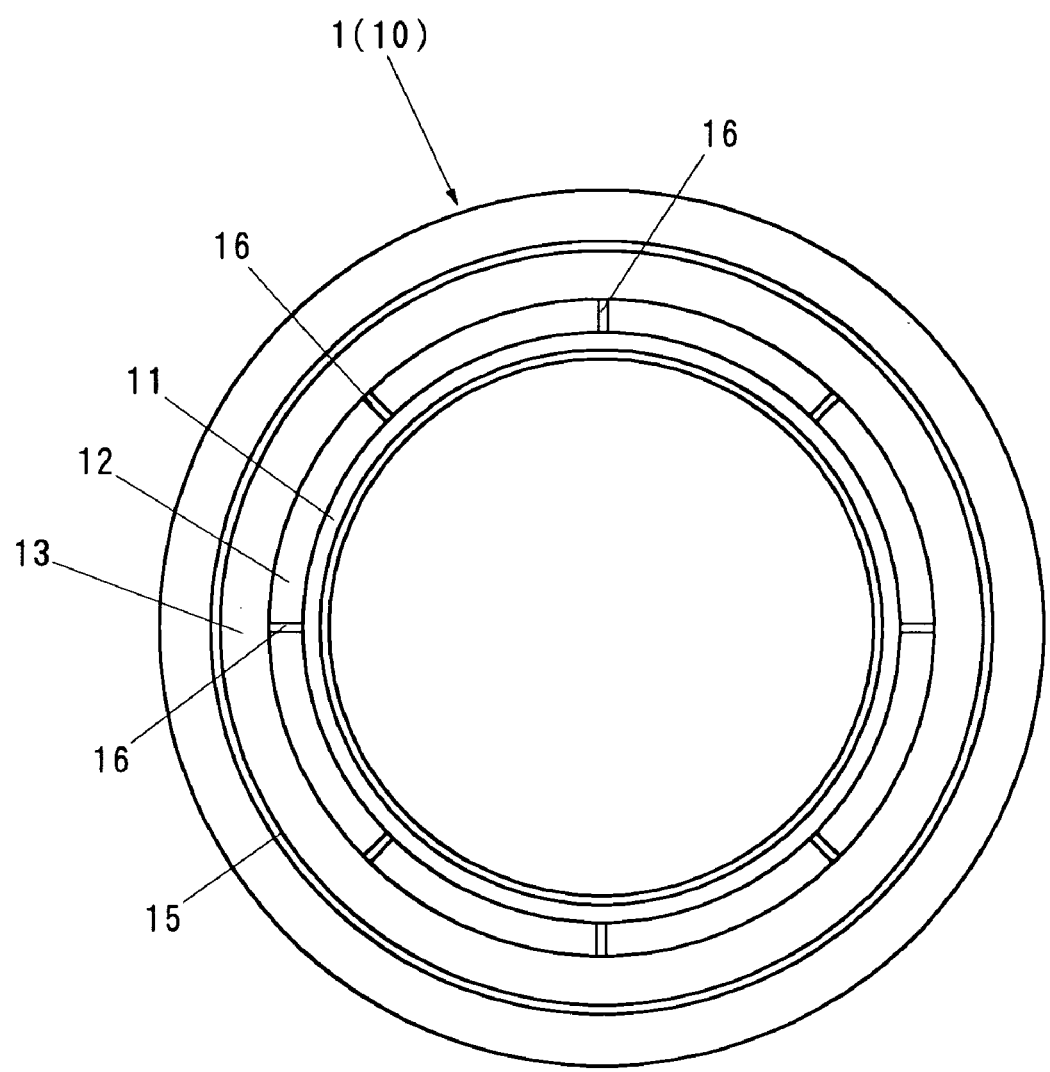
FIG. 3 is a bottom view of an air filter element 1 in accordance with Example 1.

As shown in FIG. 3, a plurality of ribs 16 may be formed in the groove 12 to connect the inner peripheral seal portion 11 and the closure portion 13 to each other. The ribs 16 can hold the shape of the inner peripheral seal portion 11, and can adjust the degree of deflection of the inner peripheral seal portion 11. The ribs 16 are molded integrally with the inner peripheral seal portion 11 and the closure portion 13 by using a synthetic resin material.

Figure 4:
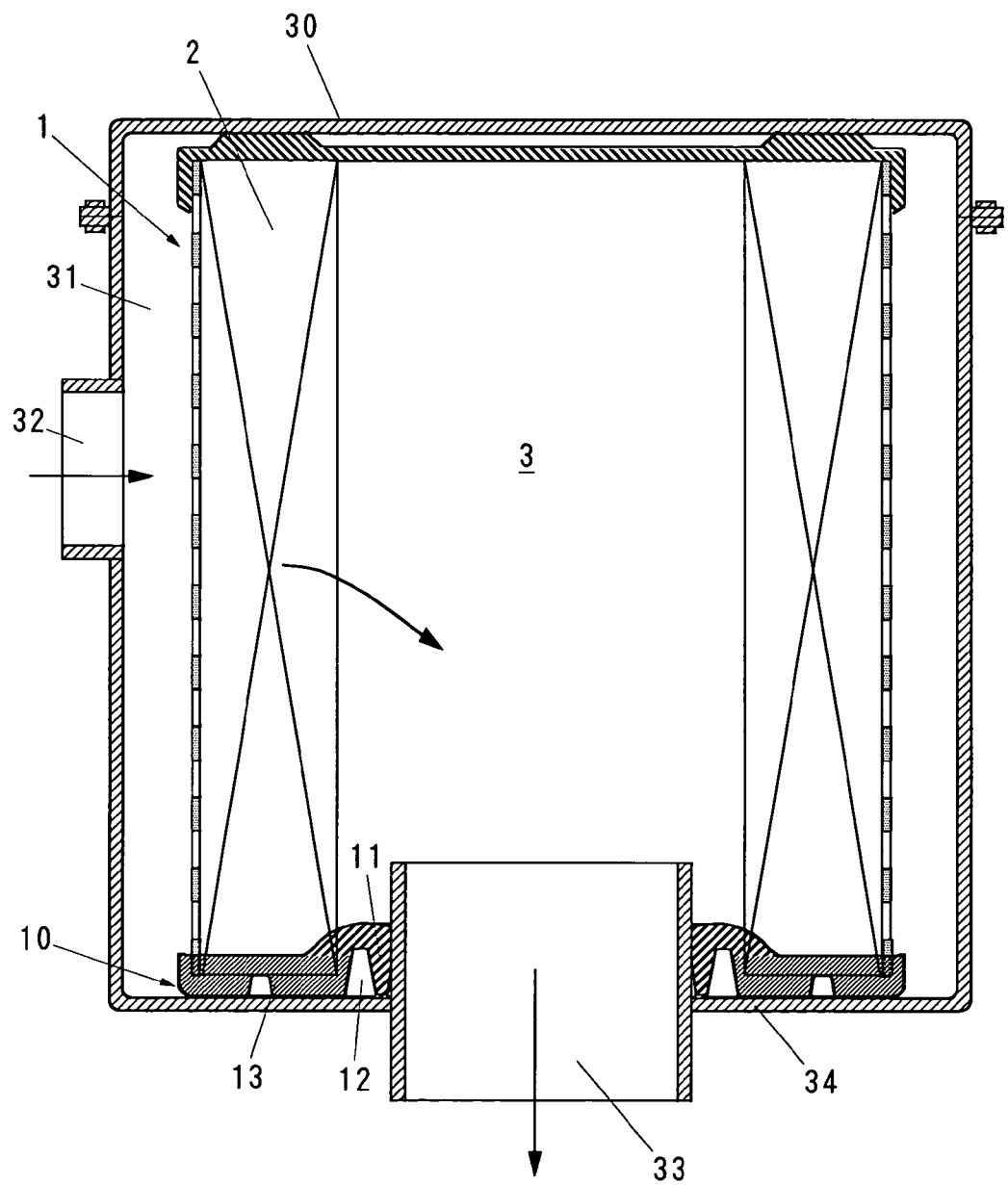
FIG. 4 is a sectional view showing a state in which an air filter element 1 in accordance with Example 1 is contained in a casing 30.

FIG. 4 shows a state in which the above-described air filter element 1 is contained in a cylindrical casing 30. On the outer periphery side of the air filter element 1 in the casing 30 is formed a non-purified air chamber 31, and on the inner periphery side of the filter portion 2 is formed a filter chamber 3. At the side wall of the casing 30, an inlet 32 communicating with the non-purified air chamber 31 is formed. In the center of one end portion of the casing 30, the cylindrical member (air outlet) 33 communicating with the filter chamber 3 is formed projectingly in the casing. On the outside in the radial direction of the cylindrical member 33, a casing bottom surface 34 is formed.

The opening 18 formed by the inner peripheral seal portion 11 is fitted on the cylindrical member 33 to contain the air filter element 1 in the casing 30. Since the inner wall 11b of the inner peripheral seal portion 11 is formed into a tapered shape so that the opening diameter decreases toward the inside in the axial direction of the air filter element, the air filter element can be fitted easily on the cylindrical member 33.

Since the opening 18 is formed by the soft inner peripheral seal portion 11 capable of sticking to the outer surface of the cylindrical member 33, reliable center seal is provided by the compression and deflection of the inner peripheral seal portion 11 caused by the cylindrical member 33. Also, since the filter portion 2 is firmly fixed by the rigid closure portion 13, the rigidity of the air filter element 1 is enhanced.

The outside air is introduced into the non-purified air chamber 31 in the casing 30 through the inlet 32, and is caused to pass through the filter portion 2 of the air filter element 1, by which dust in the air is arrested. The purified air passes through the filter chamber 3 and is discharged to the outside of the casing 30 through the air outlet 33, being introduced to an internal combustion engine or the like, not shown.

Although a case where a fluid is filtered from the outside to the inside in the radial direction of the filter portion 2 has been explained in the above description, the present invention can be applied to a case where a fluid is filtered from the inside to the outside in the radial direction of the filter portion 2 (a case where the cylindrical member 33 serves as an air inlet).

Figure 5:
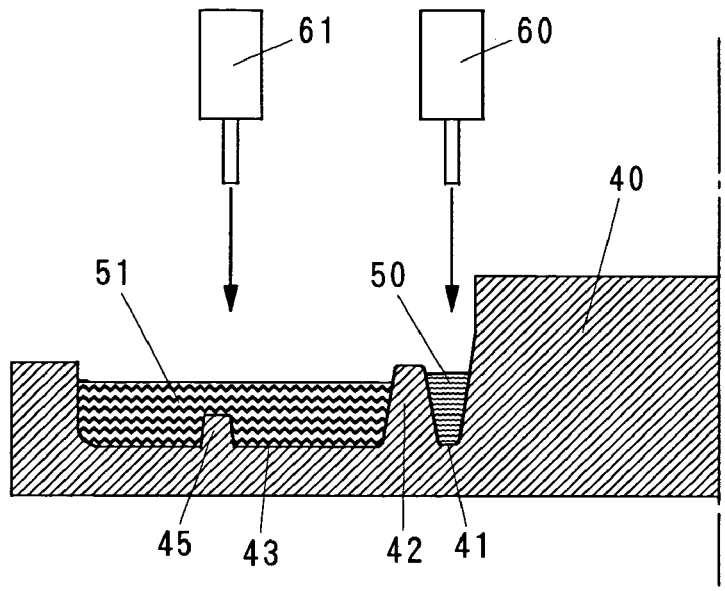
FIG. 5 is an explanatory view illustrating a method of producing an air filter element 1 in accordance with Example 1.

Next, a preferred method of producing the above-described air filter element 1 will be described. FIG. 5 is an explanatory view illustrating a method of producing the air filter element 1, in which reference numeral 40 denotes a top face open type mold for molding.

The mold 40 is provided with a ring-shaped inner peripheral concave portion 41 for molding the soft inner peripheral seal portion 11, a ring-shaped convex portion 42 for molding the groove 12, and a ring-shaped outer peripheral concave portion 43 for molding the rigid closure portion 13 successively from the inside in the radial direction. A convex portion 45 provided at the bottom of the ring-shaped outer peripheral concave portion 43, which is used to mold the concave portion 15 of the end plate 10, is formed to determine the position of the end surface 2b of the filter portion 2. The convex portion 45 is formed continuously in an annular shape or partially. The ring-shaped convex portion 42 is formed so as to be higher than the convex portion 45. In order to form the above-described ribs 16, the ring-shaped convex portion 42 has only to be eliminated partially.

As shown in FIG. 5, a predetermined amount of a synthetic resin material 50, which is soft after curing, is poured into the ring-shaped inner peripheral concave portion 41 through an injection nozzle 60, and a predetermined amount of a synthetic resin material 51, which is rigid after curing, is poured into the ring-shaped outer peripheral concave portion 43 through an injection nozzle 61. The sequence of pouring operations is not subject to any special restriction. Both pouring operations may be performed at the same time. The ring-shaped convex portion 42 prevents the synthetic resin material 50, which is soft after curing, and the synthetic resin material 51, which is rigid after curing, from being mixed inadvertently with each other.

Figure 6:
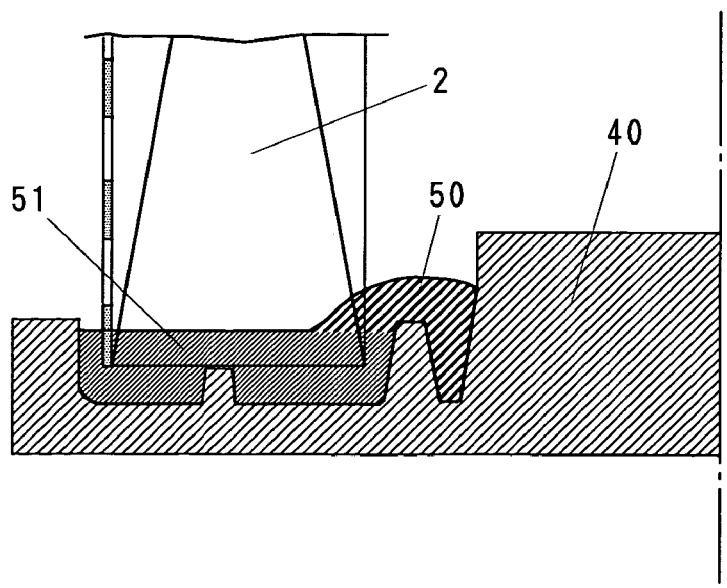
FIG. 6 is an explanatory view illustrating a method of producing an air filter element 1 in accordance with Example 1.

After both of the synthetic resin materials 50 and 51 are poured and before they are cured, the end surface of the cylindrical filter portion 2, which is in a semifinished state, is inserted into the synthetic resin material 51 which has been poured into the ring-shaped outer peripheral concave portion 43 so as to dip into the synthetic resin material 51 as shown in FIG. 6, by which both of the synthetic resin materials 50 and 51 are integrally cured. It is preferable that the soft synthetic resin material 50 in the ring-shaped inner peripheral concave portion 41 be caused to overflow to the rigid synthetic resin material 51 side to be cured integrally with the synthetic resin material 51. At the time of curing, the synthetic resin materials are usually heated. After curing, the filter portion 2 is taken out of the mold 40. Thereby, the end plate 10 of composite construction in which the soft inner peripheral seal portion 11 and the rigid closure portion 13 in which the end surface of the filter portion 2 is embedded are integrally molded can be obtained. After or before that, the opposite end surface of the filter portion 2 is closed.

The position of boundary between the soft inner peripheral seal portion 11 and the rigid closure portion 13 can be changed by controlling the viscosity, pouring speed, pouring amount, pouring position, etc. of each synthetic resin material 50, 51. Pouring operation of both of the synthetic resin materials 50 and 51 is usually performed while the mold 40 is rotated around the center of the mold. The synthetic resin materials 50 and 51 can be poured simultaneously or successively. Simultaneous pouring operation simplifies the process and shortens the operation time.

The embodiment of the present invention has been described by taking examples. The present invention is not limited to the above-described embodiment, and various additions and modifications can be made without departing from the spirit and scope of the present invention.

INDUSTRIAL APPLICABILITY

As described above, the air filter element in accordance with the present invention is used by being contained in a casing fitted with a cylindrical member formed projectingly in the casing. This air filter element is useful as a filter element for various air cleaner or air filter for purifying contaminated air, and in particular, as an air filter element for an internal combustion engine. Also, according to the method of producing the air filter element in accordance with the present invention, the above-described air filter element can be produced easily and reliably.

The invention claimed is:

1. An air filter element used by closing both end surfaces of a hollow cylindrical filter portion by end plates, by forming an opening through which a fluid passes in the center of at least one end plate, and by fitting said opening on a cylindrical member, wherein said one end plate comprises a soft inner peripheral seal portion capable of sticking to the outer surface of said cylindrical member and a rigid closure portion which is disposed on the outer periphery side of said inner peripheral seal portion and in which the end surface of said filter portion is embedded, said end plate being of composite construction in which said inner peripheral seal portion and said closure portion are integrally molded, wherein on the outer periphery side of said inner peripheral seal portion, a groove axially extending from the end surface of said end plate is formed along said opening, said groove being located on the inside in the radial direction of the inner peripheral surface of said filter portion, and on the outer periphery side of said groove, said closure portion is formed; and the inside wall portion of said groove is formed by said inner peripheral seal portion, and the outside wall portion of said groove is formed by said rigid closure portion.

2. The air filter element according to claim 1, wherein a plurality of ribs which connect said inner peripheral seal portion and said closure portion to each other are provided in said groove.

3. The air filter element according to claim 1 or 2, wherein said inner peripheral seal portion is formed of soft expanded urethane resin, and said closure portion is formed of rigid urethane resin.

4. A method of producing an air filter element used by closing both end surfaces of a hollow cylindrical filter portion by end plates, by forming an opening through which a fluid passes in the center of at least one end plate, and by fitting said opening on a cylindrical member, wherein a mold is used which is provided, with a ring-shaped inner peripheral, concave portion for molding a soft inner peripheral seal portion, a ring-shaped convex portion for forming a groove in the end surface of the end plate, and a ring-shaped outer peripheral concave portion for molding a rigid closure portion successively from the inside in the radial direction; a synthetic resin material, which is soft after curing, is poured into said ring-shaped inner peripheral concave portion; a synthetic resin material, which is rigid after curing, is poured into said ring-shaped outer peripheral concave portion; and then the end surface of said filter portion is inserted into said ring-shaped outer peripheral conncave portion to integrally cure both of said synthetic resin material, whereby an air filter element is produced in which said one end plate comprises a soft inner peripheral seal portion capable of sticking to the outer surface of said cylindrical member and a rigid closure portion which is disposed on the outer periphery side of said inner peripheral seal portion and in which the end surface of said filter portion is embedded, said end plate being of composite construction in which said inner peripheral seal portion and said closure portion are integrally molded; on the outer periphery side of said inner peripheral seal portion, a groove axially extending from the end surface of said end plate is formed along said opening; and on the outer periphery side of said groove, said closure portion is formed.

* * * * *